(12) United States Patent
Islam et al.

(10) Patent No.: US 10,957,968 B2
(45) Date of Patent: Mar. 23, 2021

(54) DEPLOYABLE AND RETRACTABLE ANTENNA ARRAY MODULE

(71) Applicant: MOTOROLA MOBILITY LLC, Chicago, IL (US)

(72) Inventors: Md Rashidul Islam, Lombard, IL (US); Mohammed R. Abdul-Gaffoor, Palatine, IL (US); Hugh K. Smith, Palatine, IL (US); Michael F. Paradise, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/196,222

(22) Filed: Nov. 20, 2018

(65) Prior Publication Data

US 2020/0161740 A1    May 21, 2020

(51) Int. Cl.
| | |
|---|---|
| *H01Q 1/12* | (2006.01) |
| *H04B 1/3827* | (2015.01) |
| *H04M 1/72454* | (2021.01) |
| *H04M 1/02* | (2006.01) |
| *H01Q 21/06* | (2006.01) |
| *H01Q 1/24* | (2006.01) |
| *H04W 4/029* | (2018.01) |
| *H01Q 21/28* | (2006.01) |
| *H01Q 21/30* | (2006.01) |
| *H04W 4/21* | (2018.01) |

(52) U.S. Cl.
CPC ........... *H01Q 1/1257* (2013.01); *H01Q 1/244* (2013.01); *H01Q 21/061* (2013.01);
(Continued)

(58) Field of Classification Search
CPC .... H01Q 1/1257; H01Q 1/244; H01Q 21/061; H01Q 21/28; H01Q 21/30; H04B 1/3833;
(Continued)

(56) References Cited

U.S. PATENT DOCUMENTS

| | | | | |
|---|---|---|---|---|
| 6,140,970 A | * | 10/2000 | Ylijurva | ................. H01Q 1/243 343/702 |
| 6,195,050 B1 | * | 2/2001 | Kim | ...................... H01Q 1/244 343/700 MS |

(Continued)

OTHER PUBLICATIONS

Seiler, S., et al., "Physical Reconfiguration of an Origami-Inspired Deployable Microstrip Patch Antenna Array", Air Force Office of Scientific Research (AFOSR), IEEE, 2017.

*Primary Examiner* — Yuwen Pan
*Assistant Examiner* — Hung K Du
(74) *Attorney, Agent, or Firm* — Yudell Isidore PLLC

(57) ABSTRACT

A method, wireless communication device (WCD), and computer program product deploys an additional, retractable antenna to enhance signal communication within an identified network. A processor executes an antenna deployment module (ADM) in order to determine a link status based on a quality and/or a strength of communication signals propagated via at least one stationary antenna. In response to the link status indicating that coverage of a second/target network is available or that a quality of a signal propagated within a first network is less than a threshold level, the ADM provides a deployment signal to a deployment component. In response to receiving the deployment signal, the deployment component deploys the retractable antenna by extending the retractable antenna from a stowed position to a deployed position. The ADM enables the WCD to communicate within the selected network via the deployed retractable antenna using a higher quality communication signal.

20 Claims, 10 Drawing Sheets

(52) U.S. Cl.
CPC ........ *H04B 1/3833* (2013.01); *H04M 1/0283* (2013.01); *H04M 1/72454* (2021.01); *H04W 4/029* (2018.02)

(58) Field of Classification Search
CPC ........... H04M 1/0283; H04M 1/72569; H04M 1/72454; H04M 1/0235; H04W 4/029; H04W 4/021
See application file for complete search history.

(56) References Cited

U.S. PATENT DOCUMENTS

| | | | | |
|---|---|---|---|---|
| 6,330,151 | B1* | 12/2001 | Bates, III | G06K 19/0718 361/679.02 |
| 6,509,876 | B1* | 1/2003 | Jones | H01Q 1/243 343/702 |
| 7,098,855 | B2* | 8/2006 | Kotzin | H01Q 1/242 343/702 |
| 2004/0198411 | A1* | 10/2004 | Cheng | H04W 88/02 455/550.1 |
| 2008/0132283 | A1* | 6/2008 | Ponce De Leon | H04B 1/3838 455/566 |
| 2013/0208713 | A1* | 8/2013 | Hamade | H04W 36/0022 370/338 |
| 2017/0244903 | A1* | 8/2017 | Yang | H04N 5/2252 |
| 2017/0289960 | A1* | 10/2017 | Moustafa | H04L 5/14 |
| 2018/0152883 | A1* | 5/2018 | Fang | H04W 48/16 |
| 2018/0227166 | A1* | 8/2018 | Palenius | H04W 52/0274 |
| 2018/0279202 | A1* | 9/2018 | Tenny | H04W 76/14 |
| 2019/0103653 | A1* | 4/2019 | Jeong | H01L 23/28 |
| 2020/0229255 | A1* | 7/2020 | Kang | H04W 48/10 |

\* cited by examiner

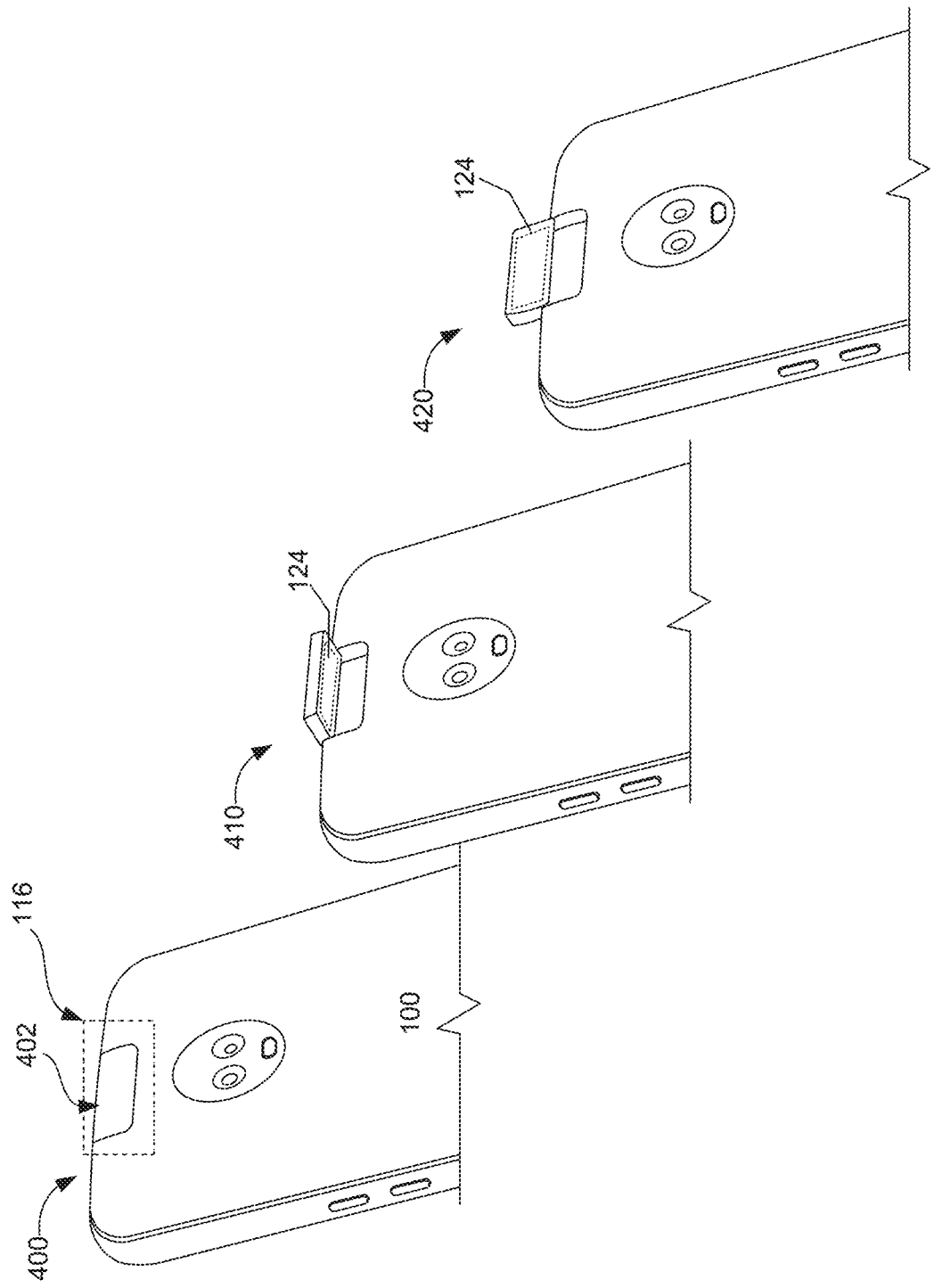

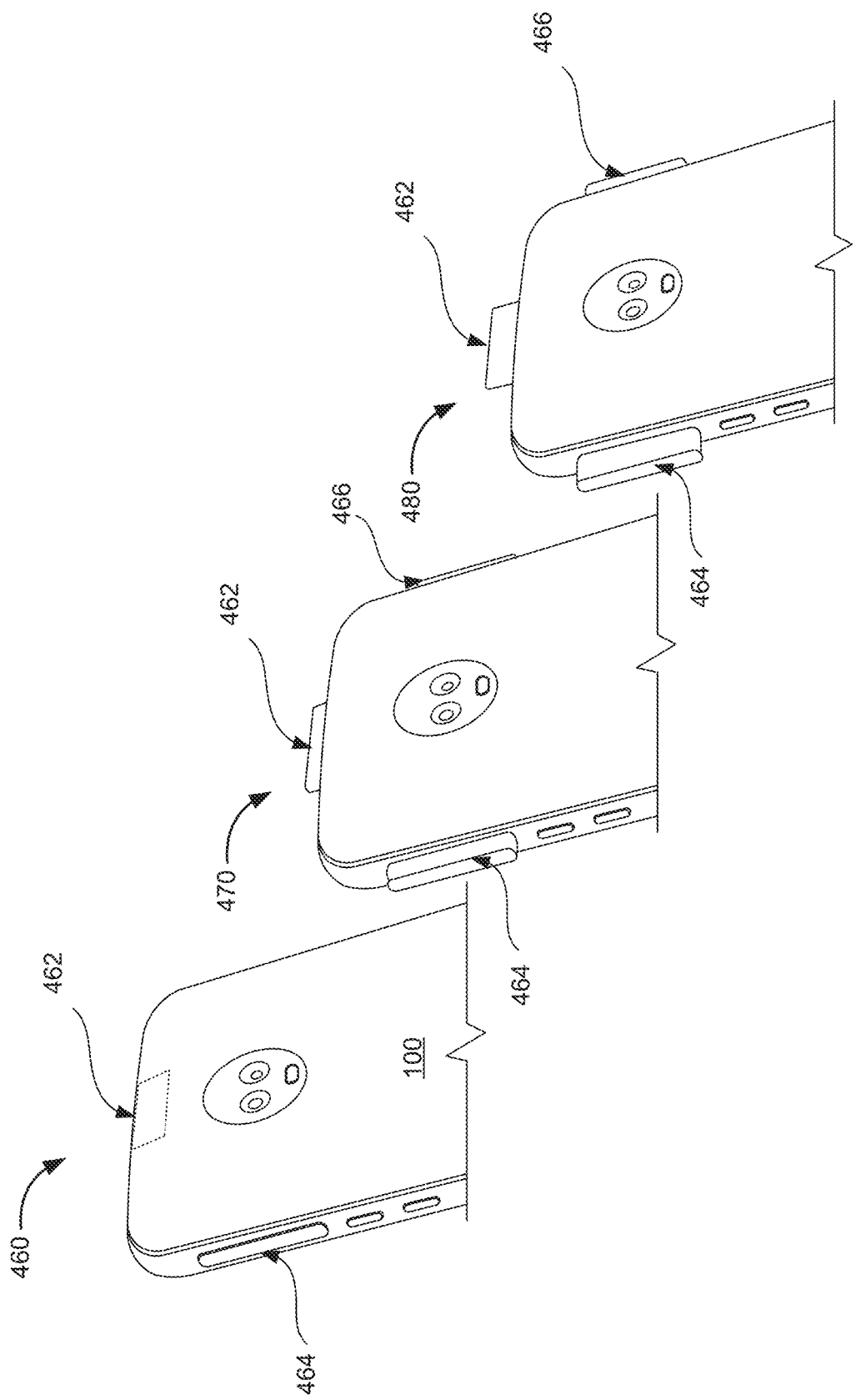

DEPLOYABLE AND RETRACTABLE ANTENNA ARRAY MODULE

TECHNICAL FIELD

The present disclosure generally relates to antenna arrays and more particularly to deploying antenna arrays within wireless communication devices.

DESCRIPTION OF THE RELATED ART

Smart-phones or user equipments (UEs) in a 5th generation wireless communication network need to operate at millimeter (mm) wave frequencies in order to provide gigabit per sec (Gbps) data rate levels. In order to achieve these high data rates, antenna arrays are required both at the UE and at the base-station (BS). These antenna arrays operate primarily to overcome propagation losses and minimize interferences among users. Implementing antenna arrays in a UE or smart-phone requires a larger keepout area on the back of the UE. This requirement, which precludes having a complete metal phone or a phone with a metal back, also impacts the phone's visual design. Even for a phone with glass or other premium looking materials, placing multiple antenna array modules on the back and front of the phone adversely affects the visual identity "ID" of the phone.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 4A-4C illustrate different implementations of retractable antenna modules moving from docked to deployed states, according to multiple embodiments;

DETAILED DESCRIPTION

Figure 1A:
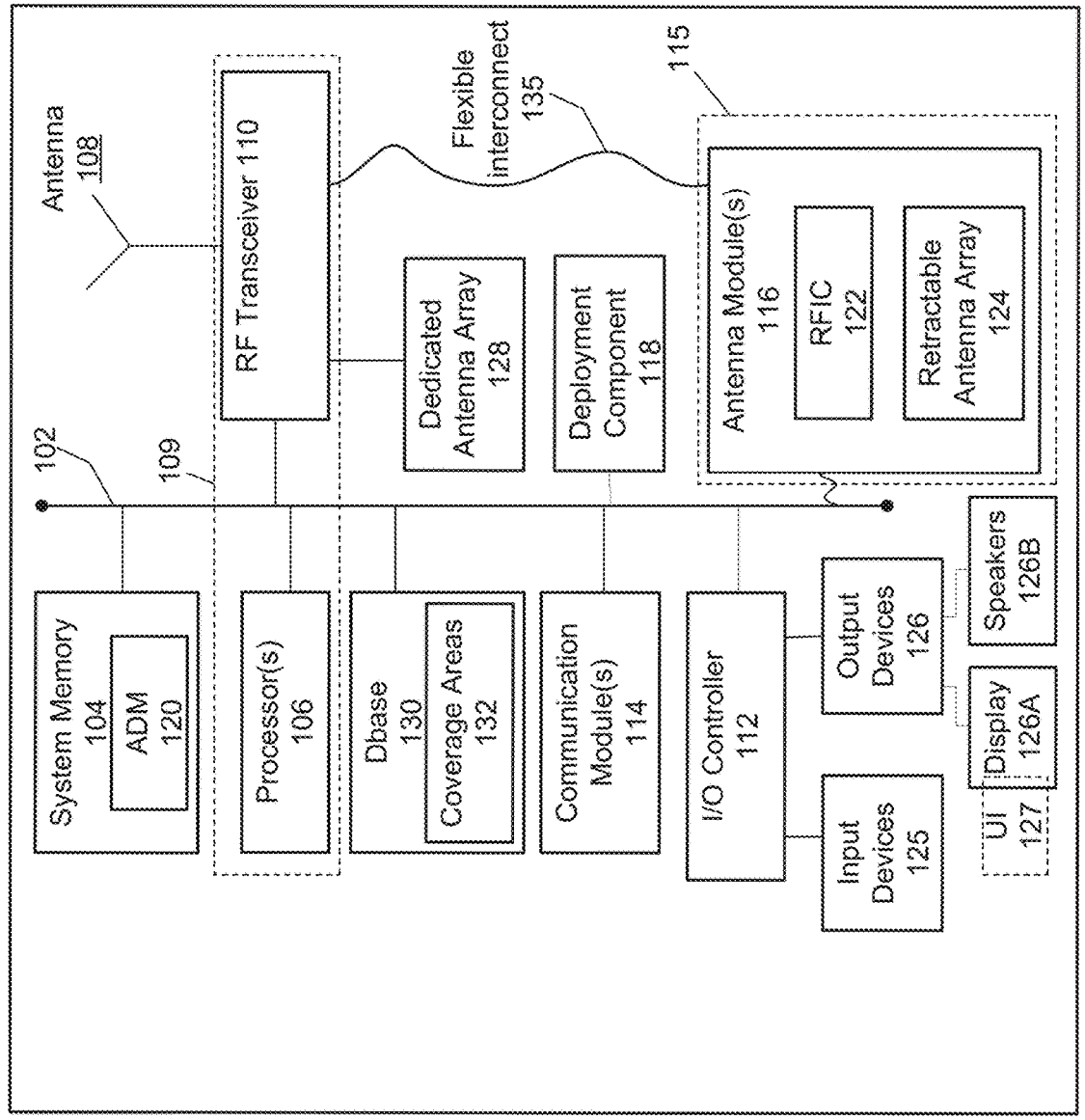
FIG. 1A illustrates a block diagram of a wireless communication device (WCD) within which various aspects of the disclosure are implemented, according to one or more embodiments.

The present disclosure provides a method, a wireless communication device (WCD), and a computer program product for deterministically deploying an additional, retractable antenna to enhance signal communication within an identified network. A processor executes an antenna deployment module (ADM) in order to determine a link status, based on a quality and/or a strength of communication signals propagated via at least one stationary antenna. In response to the link status indicating that coverage of a second/target network is available or that a quality of a signal propagated within a first network is less than a threshold level, the ADM provides a deployment signal to a deployment component. In response to receiving the deployment signal, the deployment component deploys the retractable antenna by extending the retractable antenna from a stowed position to a deployed position. The ADM enables the WCD to communicate within the selected network via the deployed retractable antenna using a higher quality communication signal.

The WCD includes at least one fixed, non-retractable antenna used for communication within a first network and a dedicated antenna used for detecting coverage/accessibility of a second/target network. According to one or more aspects, the dedicated antenna is also a fixed, non-retractable antenna, but is not used for communication via the first network. The WCD also includes at least one retractable antenna module coupled to a deployment component. The WCD also includes a radio frequency (RF) transceiver, which is coupled to the dedicated antenna, the at least one fixed, non-retractable antenna, and to the at least one retractable antenna module. The at least one retractable antenna module includes at least one retractable antenna that is configured to be movable from a stowed physical state to a deployed physical state.

In one embodiment, the RF transceiver is coupled via a flexible conductor to the at least one retractable antenna module. In one implementation, the retractable antenna module(s) includes a fifth generation (5G) mm-wave antenna array having at least one antenna element. The retractable antenna module(s) also includes at least one radio frequency integrated circuit (RFIC) respectively coupled to the 5G mm-wave antenna array. The retractable antenna module includes at least one retractable tray in which the 5G mm wave antenna array is placed and from which the 5G mm-wave antenna array can be deployed. The WCD also includes a processor that is in communication with the RF transceiver and the deployment component(s). The processor executes an antenna deployment module (ADM) in order to deploy the retractable antenna to enhance signal communication within an identified network.

The computer program product includes a computer-readable storage device having stored thereon an antenna deployment module (ADM) that, when executed, configures a processor of a wireless communication device having at least one retractable antenna to perform executable operations that trigger deployment of the retractable antenna in order to enhance signal communication within an identified network. The processor is in communication with a radio frequency (RF) transceiver and at least one deployment component(s) that enables deployment of the retractable antenna(s) to provide higher quality signal communication. The ADM module configures the processor to determine a link status based on a quality and/or a strength of communication signals propagated via at least one stationary/internal antenna. In response to the link status indicating that coverage of a second/target network is available or that a quality of a signal propagated within a first network is less than a threshold level, the processor sends a deployment signal to a deployment component. In response to receiving the deployment signal, the deployment component deploys the retractable antenna by extending the retractable antenna from a stowed position to a deployed position. The ADM enables the WCD to communicate within the selected network via the deployed retractable antenna, which provides/supports a high quality communication signal.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific components, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 1B:
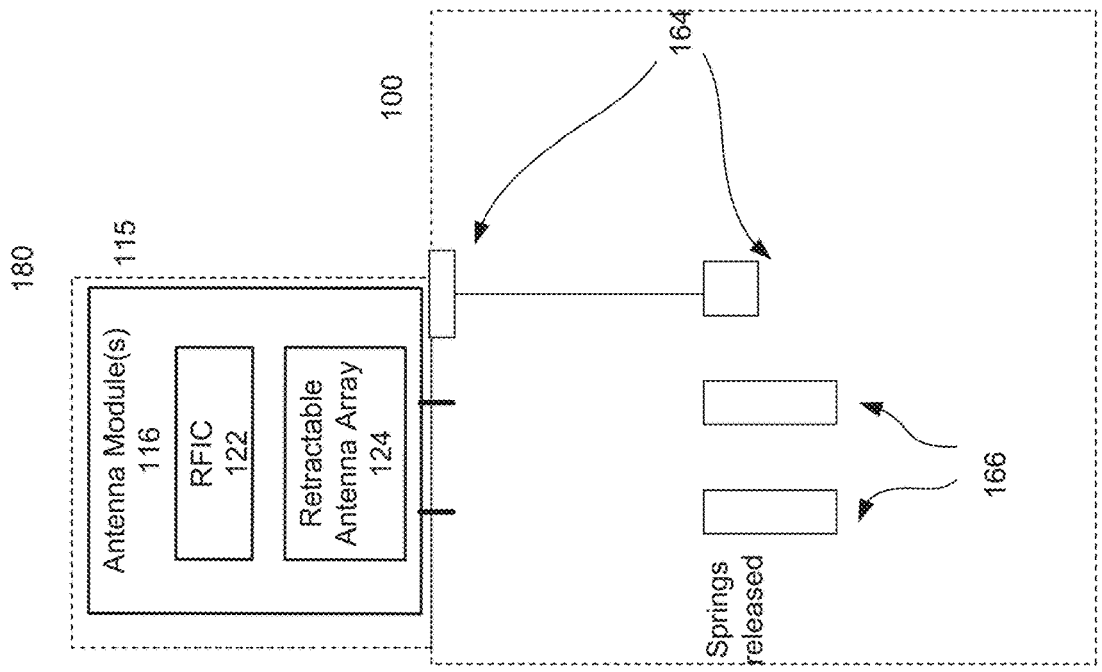
FIG. 1B illustrates an example deployment component that is employed to provide the deployed and stowed physical states of a retractable antenna module of the WCD of FIG. 1A, according to one or more embodiments.
Figure 1B:
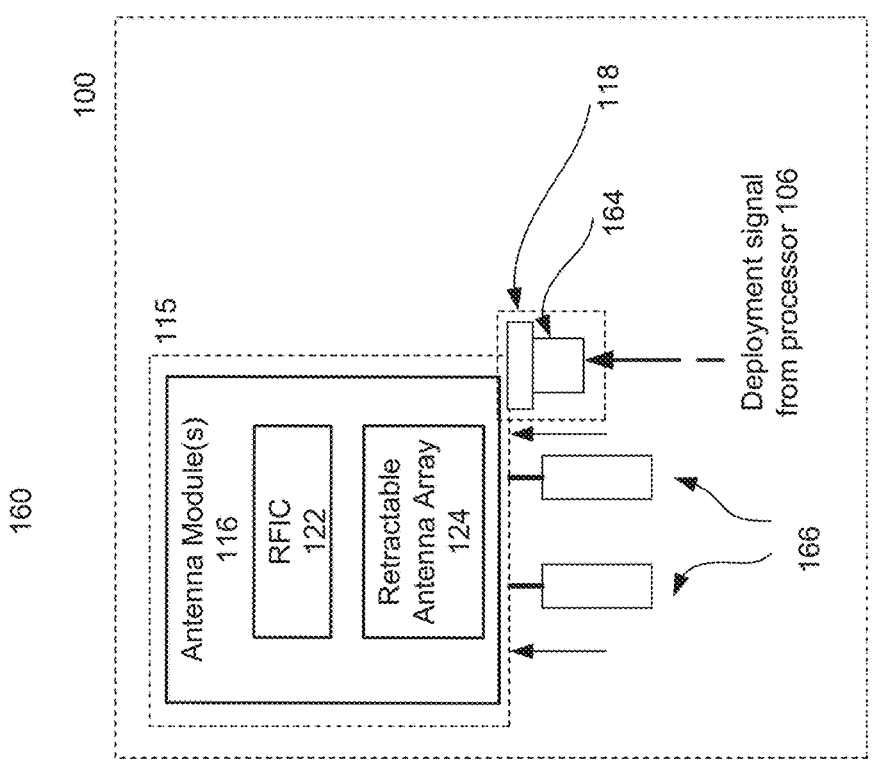

Turning now to FIG. 1, there is depicted a block diagram representation of an example wireless communication device (WCD) 100 within which several of the features of the disclosure can be implemented. WCD 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that include wireless communication functionality. As a device supporting wireless communication, WCD 100 can be one of, and also be referred to as, a system, device, subscriber unit, subscriber station, mobile station (MS), mobile, mobile device, remote station, remote terminal, user terminal, terminal, user equipment (UE), communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless functions as part of a wireless communication system.

As shown in FIG. 1, WCD 100 includes one or more processor(s) 106 coupled to system memory 104 via system interconnect 102. According to one embodiment, processor(s) 106 can include a data processor and/or a digital signal processor (DSP). System interconnect 102 can be interchangeably referred to as a system bus, in one or more embodiments. System memory 104 can include therein a plurality of executable modules, including an operating system (not shown), application(s) (not shown), and Antenna Deployment Module (ADM) 120. The various software and/or firmware modules have varying functionality when their corresponding program code is executed by processor(s) 106 or other processing devices within WCD 100.

WCD 100 further includes one or more input/output (I/O) controllers 112, which support connection by, and processing of signals from, one or more connected input device(s) 125, such as a keyboard, mouse, touch screen, or microphone. I/O controllers 112 also support connection to and forwarding of output signals to one or more connected output devices 126, such as a monitor or display device 126A or audio speaker(s) 126B.

WCD 100 includes radio frequency (RF) transceiver 110 and communication module 114 which are connected together via system interconnect 102. Communication module(s) 114 may include a near field communication transceiver, a global positioning system module, and a Bluetooth Low Energy (BLE) module, all of which are communicatively coupled to processor 106. In addition, communication module 114 includes a wireless interface (not shown) that can be used to provide Wi-Fi, Bluetooth and/or Near Field Communication (NFC) capabilities to WCD 100. Communication module 114 may also include a network interface device (NID), that enables WCD 100 to communicate and/or interface with other devices, services, and components that are located external to WCD 100. These devices, services, and components can interface with WCD 100 via an external network using one or more communication protocols. According to one or more aspects, RF transceiver 110 is a transceiver circuit that includes an amplifier, a receiver module and a transmitter module. Additionally, according to one aspect, a main printed circuit board (PCB) 109 includes RF transceiver (circuit) 110 that communicates with a flex circuit, such as RF Integrated Circuit (RFIC) 122, corresponding to retractable antenna modules 116.

WCD 100 includes at least one fixed, non-retractable antenna 108 that is used for communication within a first network. WCD 100 also includes dedicated antenna array 128, which can be used to detect accessibility/coverage of a second/target network while WCD 100 is configured for communication within the first network via fixed, non-retractable antenna(s) 108. According to one or more aspects, dedicated antenna array 128 is also a fixed, non-retractable antenna, but is not used for communication via the first network. As illustrated, RF transceiver 110 is coupled to non-retractable antenna 108 and to dedicated antenna array 128. According to one or more aspects, RF transceiver 110 is coupled to at least one antenna module 116 having at least one retractable antenna array 124. WCD 100 also includes at least one deployment component 118. Retractable antenna array 124 is configured to be movable. Utilizing the at least one deployment component 118, retractable antenna array 124 is moveable from a stowed (low-profile) physical state to a deployed (high-performance) physical state.

RF transceiver 110 is coupled via a flexible conductor 135 to the at least one antenna module 116. Processor 106 is also coupled to the at least one antenna module 116 via system interconnect 102 and flexible connecting cable, which enables antenna module 116 to be moveable relative to system interconnect 102. In one implementation, the at least one antenna module 116 includes a fifth generation (5G) millimeter (mm)-wave antenna array having at least one antenna element. The 5G mm wave antenna array is an example implementation of retractable antenna(s) 124. The antenna module(s) 116 also includes at least one radio frequency integrated circuit (RFIC) 122 coupled to the 5G mm-wave antenna array 124, and at least one retractable tray 115. During the antenna deployment process, as described in FIG. 1B, processor 106 causes the deployment component 118 to move retractable tray 115 containing 5G mm-wave antenna array 124 into the deployed physical state.

According to one aspect, antenna modules 116 are utilized as a main enabler (i.e., for providing signal communication) for 5G mm-wave network coverage. However, retractable antenna array(s) 124 of antenna modules 116 can also be used to enhance the performance of dedicated antenna array 128 within WCD 100.

Processor 106 executes ADM 120, which configures processor 106 to determine a link status based on one or more of a quality and a strength of communication signals propagated via at least one fixed, non-retractable antenna 108. Based on the link status, processor 106 determines whether retractable antenna array 124 can or should be deployed (i.e., whether to initiate deployment of retractable antenna array 124). In response to determining that the retractable antenna can/should be deployed, processor 106 provides a deployment signal associated with the determined link status to the at least one deployment component 118. In response to receiving the deployment signal, the at least one deployment component 118 deploys the at least one retractable antenna array 124, enabling WCD 100 to communicate using the at least one retractable antenna array 124. WCD 100 communicates via the at least one retractable antenna to enable propagation of a high quality signal and/or a stronger communication signal. According to one or more aspects, the retractable antenna arrays 124 are moved from the stowed to the deployed position in order to enhance signal quality or other detected conditions impacting link quality.

According to one or more aspects, processor 106 receives from a first network a notification that WCD 100 is located in the target network. In response to receiving the notification, processor 106 determines the link status.

According to one embodiment, processor 106 determines, based on one or more of a signal quality and signal strength, whether the link status indicates (i) that coverage of a target network is being detected by the dedicated antenna and/or (ii) that a quality of a signal being propagated via the at least one fixed, non-retractable antenna 108 exceeds a threshold level. For example, processor 106 determines that the link status indicates at least one of: (i) detection by the dedicated antenna array 128 of a target network coverage/accessibility; and (ii) detection that a quality of a signal being propagated within a first network via the at least one fixed, non-retractable antenna 108 has degraded to below a threshold level. In one or more related embodiments, the first network can be an existing 3G/4G network, and is used to notify WCD 100 (i.e., a user of WCD 100) that WCD 100 is currently located in the target network, such as 5G network coverage area.

According to one or more aspects, processor 106 determines the link status and utilizes the link status to indicate whether coverage of a target network (e.g., such as 5G network) is available and/or to determine a quality of signal being propagated within a current/first network. In particular, the link status can indicate whether the quality of a signal being propagated via the at least one fixed, non-retractable antenna 108 has degraded to below a threshold level. In response to determining that the link status indicates detection of at least one of (i) the coverage of a target network and (ii) threshold degradation of signal quality, processor 106 generates the deployment signal, and sends the deployment signal to the at least one deployment component 118.

In one embodiment, processor 106 configures antenna module 116 of WCD 100 and/or WCD 100 to operate in one of: (i) a manual, user initiated deployment and retraction mode for the at least one retractable antenna array 124 to enable a user to choose whether or not to deploy the at least one retractable antenna array 124; and (ii) an automatic deployment and retraction mode for the at least one retractable antenna array 124.

In response to antenna module 116 being configured to operate in the manual deployment and retraction mode, processor 106 provides, via a user interface of display 126A of WCD 100, a notification indicating the link status. The notification may further indicate whether the at least one retractable antenna array 124 is in the stowed physical state or a deployed state. If the retractable antenna(s) 124 is in the stowed physical state, processor 106 generates and issues a prompt, via the user interface of display 126A, for a user to provide a manual input in order to deploy the retractable antenna(s). Processor 106 monitors for and detects the manual input, via one of input devices 125 of WCD 100. In response to detecting the manual input, processor 106 transmits the deployment signal to deployment component 118 to trigger deployment component 118 to extend the at least one retractable antenna array 124 into the deployed position to enable propagation of a signal with an acceptable quality and/or strength. In an alternate embodiment, providing a fully manual process, the manual input can include the user physically moving the retractable antenna(s) 124 (which is housed in a protected casing) into the respective deployed position(s).

In response to WCD 100 being configured in the automatic deployment and retraction mode, processor 106 determines whether an operating environment of the wireless communication device is appropriate for deploying the retractable antenna(s) 124. Processor 106 determines a state of the operating environment while the link status indicates detected coverage of a target network and/or the degraded signal quality. For example, processor 106 can use dedicated antenna array 128 to detect an in-appropriate operating environment in which a presence of a human hand can physically prevent retractable antenna array 124 from being deployed into an extended, physical state. As another example, processor 106 can deem an operating environment to be inappropriate when a detected location of WCD 100 is in a user's pocket. According to one or more aspects, processor 106 is able to selectively deploy antennas based on an ability of each respective retractable antenna array 124 to be deployed without a user's hand or other impediment blocking/preventing an antenna's deployment. In response to determining that the operating environment of WCD 100 is suitable for deploying the retractable antenna (s) 124, processor 106 automatically generates the deployment signal. Processor 106 sends the deployment signal to the deployment component 118. In response to receiving the deployment signal, the deployment component(s) 118 automatically deploys the at least one retractable antenna array 124.

In order to determine whether coverage of the second/target network is detected, processor 106 periodically or continuously tracks a location of WCD 100 and identifies, from stored information 132 retrieved by processor 106 from storage or database 130, coverage areas that are suitable for accessing the target network. Processor 106 determines whether WCD 100 is located within one of the identified coverage areas. In response to determining that WCD 100 is located within one of the identified coverage areas, processor 106 generates the link status indicating that the coverage area of the target network is detected.

In one embodiment, processor 106 detects, via the dedicated antenna module 128, a presence of a human hand. Processor 106 may also determine that the link status indicates that the signal quality has degraded to below the threshold level. Processor 106 also determines that the degradation of the signal quality while using the at least one fixed, non-retractable antenna is correlated with the presence of the human hand. In response to the hand's presence causing the signal quality to be degraded to below the threshold level, processor 106 triggers deployment of the at least one retractable antenna 124. According to one or more aspects, processor 106 determines whether an operating environment of the wireless communication device is appropriate for deploying the retractable antenna(s) 124 before deploying retractable antenna(s) 124. For example, processor 106 can use dedicated antenna array 128 to detect an inappropriate operating environment in which a presence of a human hand can physically prevent retractable antenna 124 from being deployed into an extended, physical state. Similarly, processor 106 can also utilize dedicated antenna array 128 to deem an operating environment to be inappropriate when WCD 100 is located within a user's pocket.

According to one or more aspects, in order to enable WCD 100 to communicate using the at least one retractable antenna 124, processor 106 performs one of: (i) in response to the link status indicating that the target network is detected, switching a network access enabled for WCD 100 from a first network to a second/target network; and (ii) in response to the link status indicating that a quality of a communication signal propagated via the at least one fixed antenna 108 has degraded to below the threshold level, enhancing a quality and strength of a communication signal within the first network by utilizing the at least one retractable antenna array 124. In one embodiment, in response to the link status indicating that the target network is detected, processor 106 provides, via user interface (UI) 127 on display 126A, a notification indicating that the target network is detected and is available. In one or more related embodiments, a first network, such as an existing 3G/4G network, can be used to notify WCD 100 and the user that WCD 100 is located in the target network, such as 5G network coverage area.

Retractable antenna arrays 124 can be placed on corresponding retractable trays 115 embedded in the sides of WCD 100 (e.g., on the right, left, top, bottom) or at the front or back of WCD 100. Each antenna module 116 can have active circuits, such as RFIC 122, integrated within. According to one or more aspects, each antenna module 116 can include a single antenna array 124 or multiple antenna arrays 124. Furthermore, each antenna module 116 can have antenna arrays 124 on the top and bottom faces as well as on the edges of WCD 100. The antenna modules 116 can have flexible connections, such as flex interconnect(s) 135, to a main printed circuit board (PCB) 109 upon which processor 106 and RF transceiver 110 resides.

In the manual, user-initiated deployment and retraction mode, retractable antenna arrays 124 are user operated. For example, when a user initiates antenna deployment, such as by pressing button icon 219 (FIG. 2) via a corresponding user interface 127 (or graphical UI (GUI) 127) shown on display 126A, retractable antenna arrays 124 will extend to a deployed physical state from a docked/stowed physical state. When the button is pressed again, retractable antenna arrays 124 will return to the docked/stowed physical state. In particular, the link status can be used to determine when antenna modules 116 should be retracted and returned to the stowed/docked physical state. For example, when the link status indicates that the coverage of the 5G network is no longer available, processor 106 may initiate an automatic antenna retraction process or a manual antenna retraction process that is facilitated through the use of a user prompt via graphical user interface 127 shown on display 126A.

In one embodiment, processor 106 controls the operation of retractable antenna array modules 116 by sensing the presence of a 5G mm-wave network coverage. Dedicated antenna element or array 128 is used to sense the 5G mm-wave network coverage. In a manual deployment and retraction mode, the user is prompted, visually through display 126a or audibly via speakers 126b, to press a button or touch an icon presented on the user interface for deploying the retractable antenna arrays 124. Alternatively, the retractable antenna arrays 124 can be automatically deployed after detecting the 5G network. An existing 3G/4G network can be used to notify the user when the user is in a 5G coverage area. Then, the user can press/touch the button/ icon to make the retractable antenna arrays 124 operational. When used to enhance the performance of fixed (non-retractable) antenna arrays 128 within WCD 100, the retractable antenna arrays 124 can be brought into operation after detecting any performance degradation of the fixed, non-retractable antenna array(s) 128.

FIG. 1B illustrates an example deployment component that is employed within an antenna deployment/retraction mechanism to provide the deployed and stowed physical states of retractable antenna arrays 124, according to one or more embodiments. WCD 100 is shown within first/stowed state 160 and second/deployed state 180. As illustrated, WCD 100 comprises retractable tray 115 within which antenna module 116 having retractable antenna array 124 is housed. In addition, WCD 100 comprises deployment component 118 that includes one or more electro-mechanical components. For example, in one implementation, deployment component 118 comprises an electromechanical moving device 164 (e.g., a stepper motor) that is physically coupled to retractable antenna module 116 and spring-loaded components 166 coupled to retractable tray 115. In addition, deployment component 118 is electrically coupled to processor 106.

In order to move retractable antenna array 124 from an antenna location within the device casing corresponding to a stowed physical state, as shown in stowed state 160, processor 106 sends a deployment signal to deployment component 118, which enables electromechanical moving device 164 to cause spring loaded components 166 to release retractable tray 115. The deployment signal enables electro-mechanical moving device 164 to extend released retractable tray 115 into the deployed physical state 180.

Figure 4B:
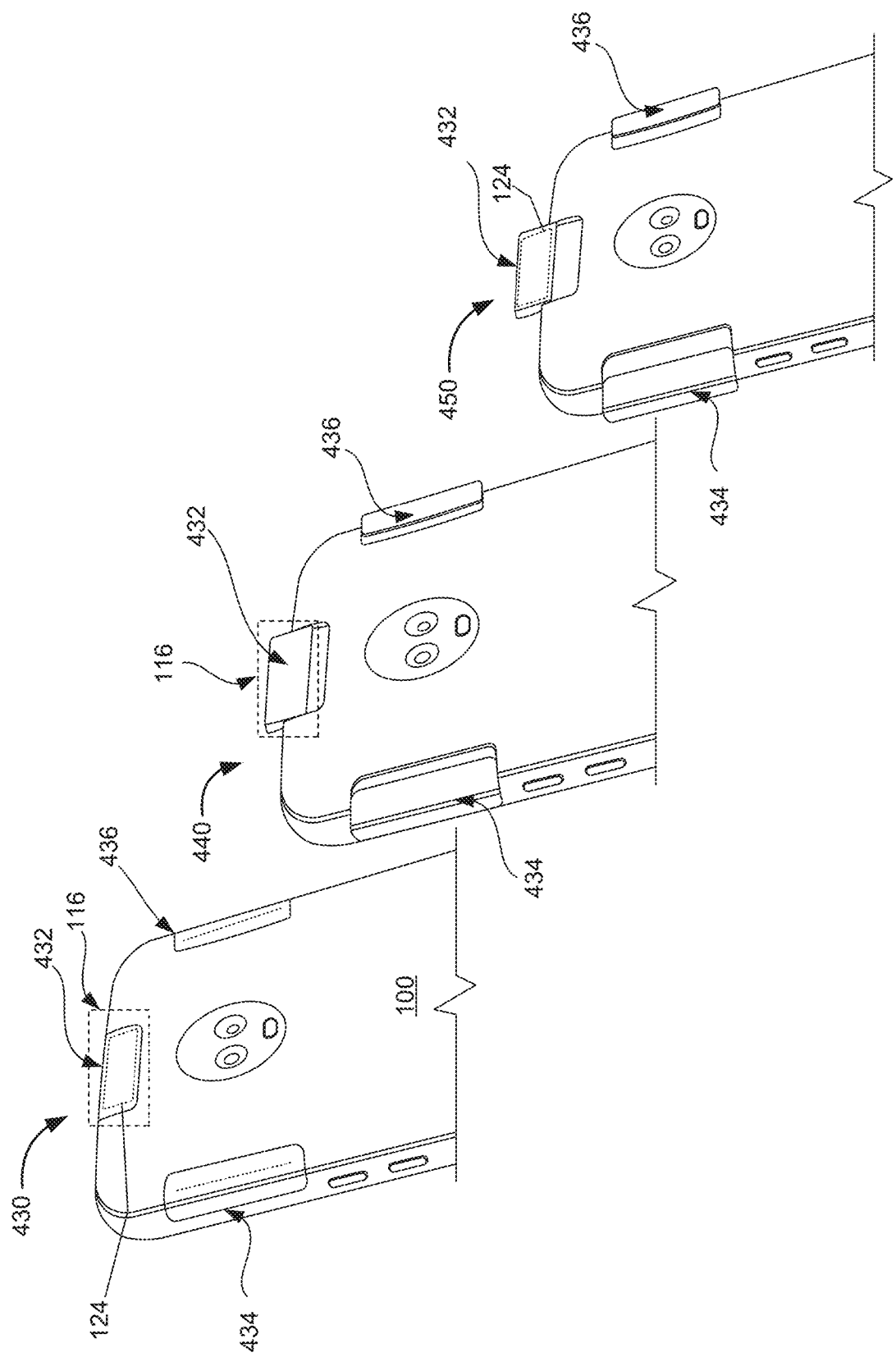

In order to return antenna array 124 from the deployed physical state to the stowed physical state, deployment component utilizes electro-mechanical moving device (and spring loaded mechanism, where applicable) to draw antenna tray 115 back within a casing of WCD 100 It is appreciated that the actual mechanism(s) utilized for deploying and retracting antenna array 124 will change based on the different possible implementations of retractable antenna arrays (see, for example, FIGS. 4A-4C). Further, different methods and/or mechanisms can be utilized to perform the deployment/retraction across the different embodiments. The presented mechanisms of FIG. 1B and description thereof are not intended to be limiting in any way on the actual mechanism(s) utilized to enable and/or perform these functions in a WCD with retractable antennas.

Figure 2:
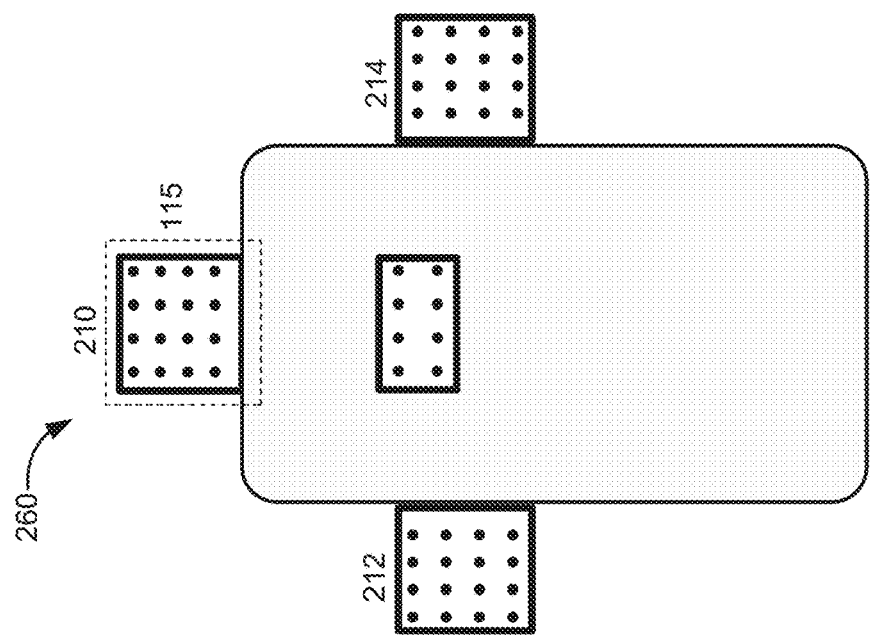
FIG. 2 illustrates multiple views of the wireless communication device depicting antenna arrays moved from docked to deployed physical states following a user input, according to one or more embodiments.
Figure 2:
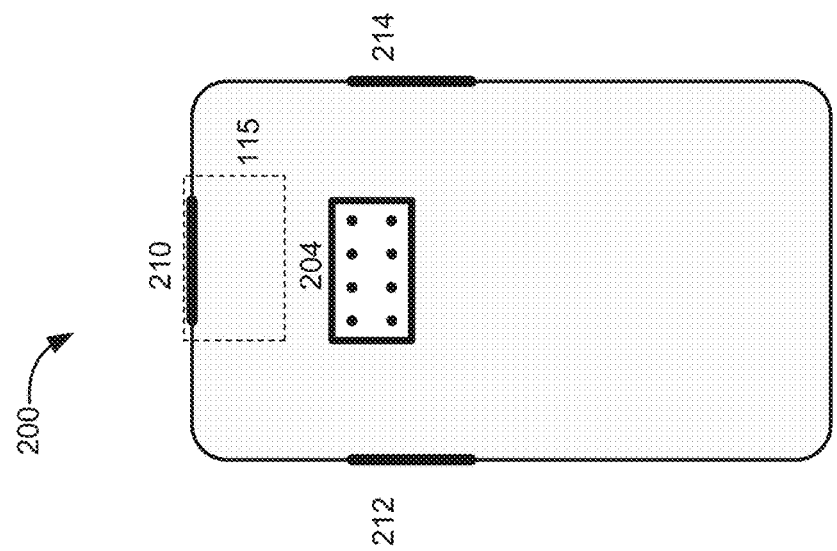

FIG. 2 illustrates multiple views of the WCD 100 depicting antenna arrays in docked and deployed physical states, according to one or more embodiments. WCD 100 is illustrated with three (3) views including first view 200, second view 240 and third view 260. Each view depicts various antennas and/or other features of WCD 100. First view 200 provides an anterior view of WCD 100. Dedicated antenna array 204 is illustrated as being housed proximate to a back side of WCD 100. Three retractable antenna modules (116) are shown in first view 200. As shown, WCD 100 includes first retractable antenna module 210 on a top side of WCD 100, second retractable antenna module 212 on a left side of WCD 100 and third retractable antenna module 214 on a right side of WCD 100. Retractable antenna modules 210, 212 and 214, which are collectively referred to herein as retractable antenna module(s) 116, are in the stowed physical state within respective retractable tray 115.

Dedicated antenna array 204 is capable of sensing 5G network coverage. If dedicated antenna array 204 detects a 5G network coverage, processor 106 provides notification 218, displayed on a user interface of WCD 100, as shown in second view 240 of device screen, to notify a user of WCD 100 of the detected target/5G network coverage and to prompt the user of WCD 100 to manually deploy, if desired, the retractable antenna modules 210, 212, 214, collectively identified as retractable antenna modules 116. For example, the user can deploy retractable antenna modules 116 by selecting/pressing button icon 219 presented within UI 127. Third view 260 depicts first, second and third retractable antenna modules 210, 212 and 214 in the deployed physical state, with at least first antenna module 210 depicted within a corresponding, extended, retractable tray 115.

Figure 3:
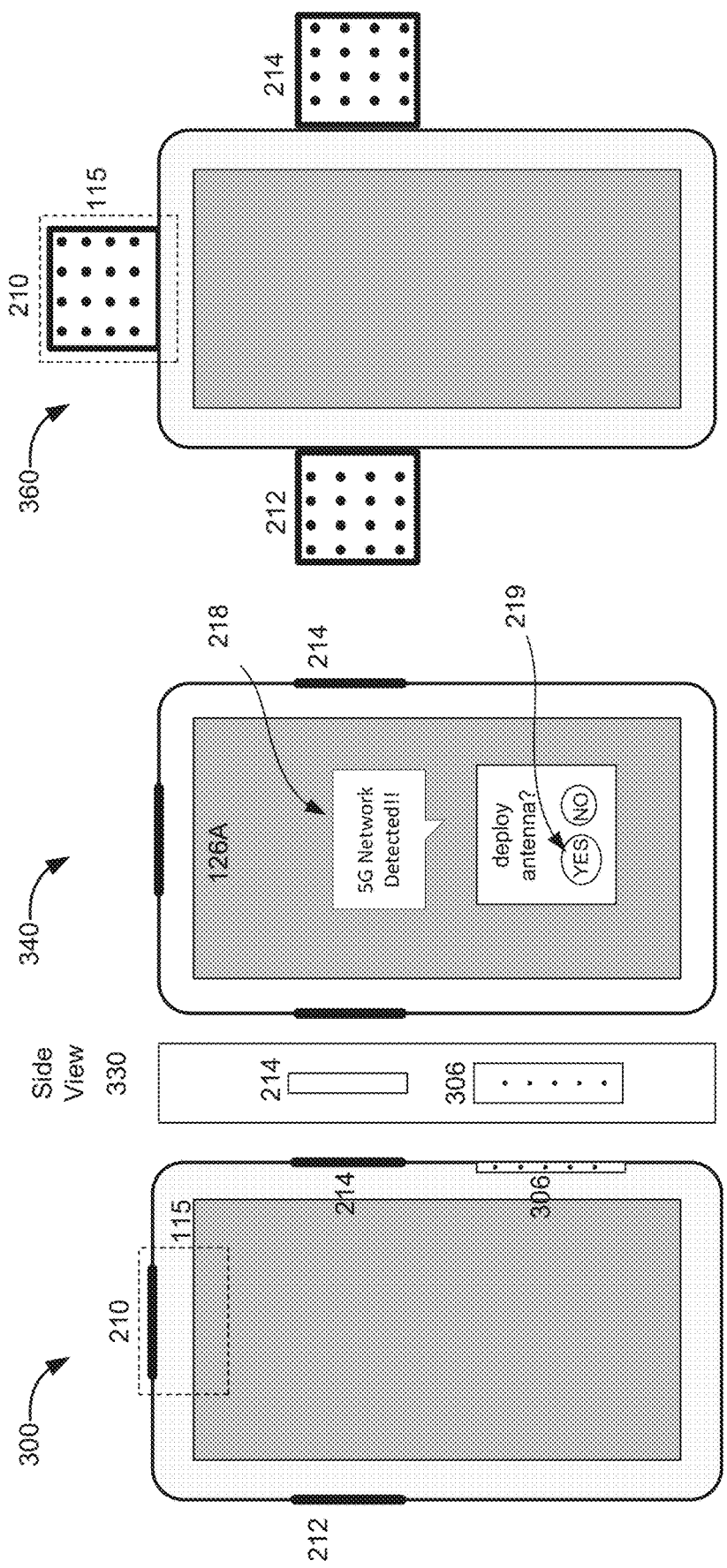
FIG. 3 illustrates multiple views of the wireless communication device having a fixed antenna array and multiple retractable antenna arrays moved from a docked to a deployed state following a user input, according to one or more embodiments.

FIG. 3 illustrates multiple views of the wireless communication device having a fixed antenna array and multiple retractable antenna arrays, according to one or more embodiments. WCD 100 is illustrated with three (3) front (of device) views including first view 300, second view 340 and third view 360, and one side view 330. Each front view depicts a location of various antennas and/or other features of WCD 100. WCD 100 includes three (3) retractable antenna array modules. As shown in first view 300, WCD 100 comprises first antenna module 210 on a top side of WCD 100, second antenna module 212 on a left side of WCD 100, and third antenna module 214 on a right side of WCD 100. As illustrated, antenna modules 210, 212 and 214 are in the stowed physical state, with antenna module 210 shown stowed within retractable tray 115. It is appreciated, that each retractable antenna modules 210, 212 and 214 can be stowed in a respective retractable tray (115). Dedicated antenna array 306 and antenna module 214 are illustrated on a side of WCD 100, as illustrated within side view 330.

Dedicated antenna array 306 is capable of sensing 5G network coverage. If dedicated antenna array 306 detects 5G network coverage, processor 106 provides notification 218, displayed on user interface 127 shown on display 126A of WCD 100, as shown in second view 340, to notify a user of WCD 100 of the detected target/5G network cover and to prompt the user of WCD 100 to manually deploy, if desired, antenna modules 210, 212, 214. Third view 360 depicts first, second, and third retractable antenna modules 210, 212 and 214 in the deployed physical state within extended, retractable tray(s) 115.

According to one embodiment and as shown within first view 200 and third view 260 of FIG. 2, a dedicated antenna array (204) is housed proximate to a back side of WCD 100. However, in an alternate embodiment, illustrated within side view 330 of FIG. 3, a dedicated antenna array (306) is positioned on a side edge, instead of being positioned on the back side of WCD 100. In yet another embodiment, WCD 100 can include both dedicated antenna array 204 and dedicated antenna array 306 respectively positioned on the back side and the side edge of WCD 100.

FIGS. 4A-4C illustrate different implementations of the retractable antenna modules, according to multiple embodiments. For simplicity, each of the different embodiments of FIGS. 4A-4C are described as presenting different embodiments of the implementation of "retractable" antenna arrays. However, as illustrated by the different embodiments and as utilized herein, the term retractable is intended to refer generally to the ability of the antenna array to be moved into a deployed physical state and then moved back into a stowed state, regardless of the manner in which the antenna is moved relative to the device. Accordingly, as provided by FIGS. 4A-4C, a retractable antenna array can be rotated around a hinge or other attachment to casing/device (FIG. 4A), slide-ably translated from an exterior position on the casing of device (FIG. 4B), or mechanically extended from within a crevice or slot created within the device casing (FIG. 4C). For simplicity, each reverse movement (following a deployment) to stow the antenna(s) within the following description can be generally referred to as a retraction of the antenna array and/or antenna tray.

FIG. 4A provides three related and/or associated views of WCD 100 having a single antenna module positioned on a back side of WCD 100 and multiple antenna modules that are moved from stowed physical states to deployed antenna states. In first view 400, antenna module 116 includes rectangular rotatable tray 402 which houses retractable antenna array 124 (shown as a dashed outline in the FIG. 4A). In order to activate antenna module 116, processor 106 provides a deployment signal to deployment component 118 that enables retractable tray 402 to move from a stowed physical state shown in view 400 to an extended physical state as illustrated within view 410.

In view 410, deployment component 118 deploys antenna module 116 using a rotational mechanism, which can be one or more electro-mechanical components of deployment component 118 (FIG. 1). The rotational mechanism enables retractable antenna array 124 to be extended by rotating "retractable" or rotatable tray 402 and/or enabling retractable tray 402 to be rotated towards the deployed physical state.

In view 420, deployment component 118 deploys antenna module 116 using a translational mechanism, which can be a different type electro-mechanical component of deployment component 118. The translational mechanism enables retractable (i.e., slideable or translatable) antenna array 124 (FIG. 1A) to be extended by moving retractable tray 402 and/or enabling retractable tray 402 to move towards the deployed physical state.

FIG. 4B provides three related and/or associated views of WCD 100 having multiple antenna modules that are moved from respective stowed physical states to respective fully extended, deployed states. In first view 430, antenna modules 116 include L-shaped retractable trays. These trays include first retractable tray 432 located proximate to a back side and top edge of WCD 100, second retractable tray 434 located proximate to a back side and left side edge of WCD 100, and third retractable tray 436 located proximate to a back side and right side edge of WCD 100. In order to activate antenna modules 116, processor 106 provides a deployment signal to deployment component 118 that enables retractable trays 432, 434 and 436 to move from respective stowed physical states shown in view 430 to respective extended physical states as illustrated within view 450. In second view 440, deployment component 118 initiates a deployment of antenna module 116 using a translational mechanism in which retractable antenna arrays 124 are extended by moving retractable trays 432, 434 and 436 towards a partially extended physical state. In third view 450, retractable trays 432, 434 and 436 are positioned in the fully extended and deployed physical state.

FIG. 4C provides three related and/or associated views of WCD 100 having multiple antenna modules that are moved from stowed physical states to deployed states. The antenna trays and antenna modules are physically inserted/embedded into a slot in the casing of WCD 100, with an exposed exterior surface of the respective antenna trays designed to be flush against the casing. In first view 460, antenna modules 116 include rectangular shaped retractable trays that include first retractable array 462 located along a top edge of WCD 100, second retractable tray 464 located proximate to a left side edge of WCD 100 and third retractable tray 466 located proximate to a right-side edge of WCD 100. In order to activate antenna modules 116, processor 106 provides a deployment signal to deployment component 118 (FIG. 1A) that enables retractable trays 462, 464 and 466 to move from respective stowed physical states shown in view 460 to respective extended physical states as illustrated within view 480. In a second view 470, deployment component 118 deploys antenna module 116 using a translational mechanism in which retractable antenna arrays 124 are extended by moving retractable trays 462, 464 and 466 towards a partially extended physical state. In a third view 480, retractable trays 462, 464 and 466 are positioned in the fully extended and deployed physical state.

Figure 5:
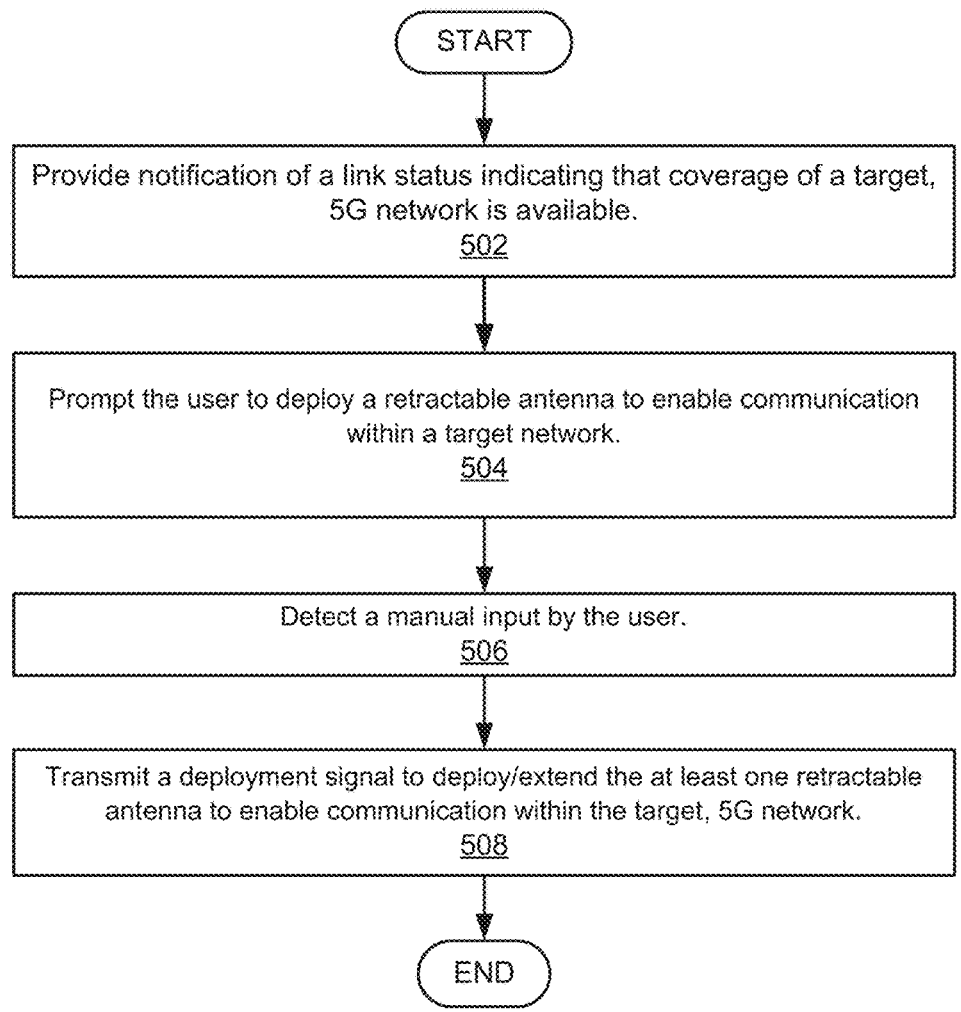
FIG. 5 is a flow chart illustrating a method for deploying a retractable antenna array in response to a manual user input, according to one or more embodiments.
Figure 6:
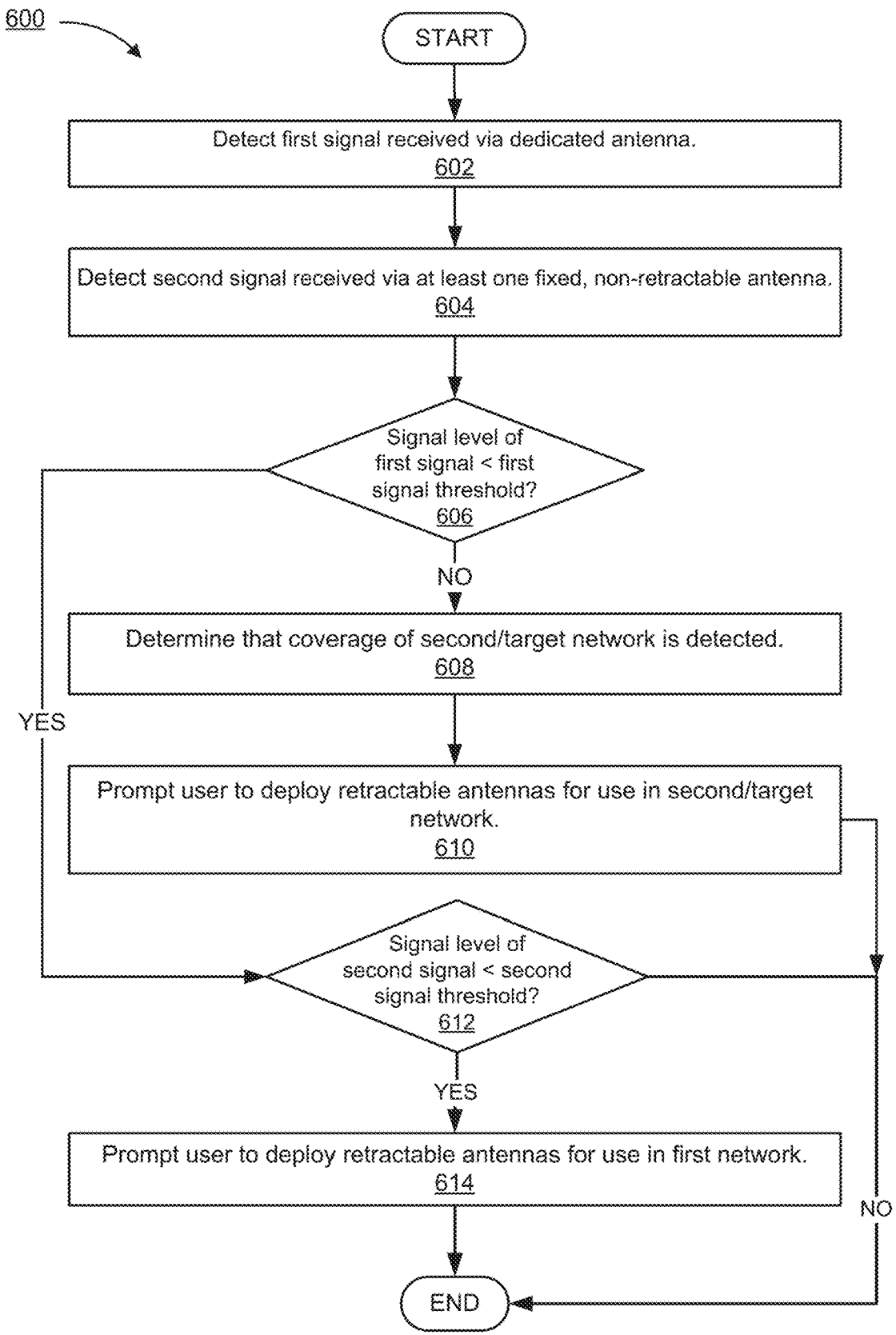
FIG. 6 is a flow chart illustrating a method for deploying a retractable antenna array based on a detected signal quality and/or strength of signals propagated within at least one network, according to one or more embodiments.
Figure 7:
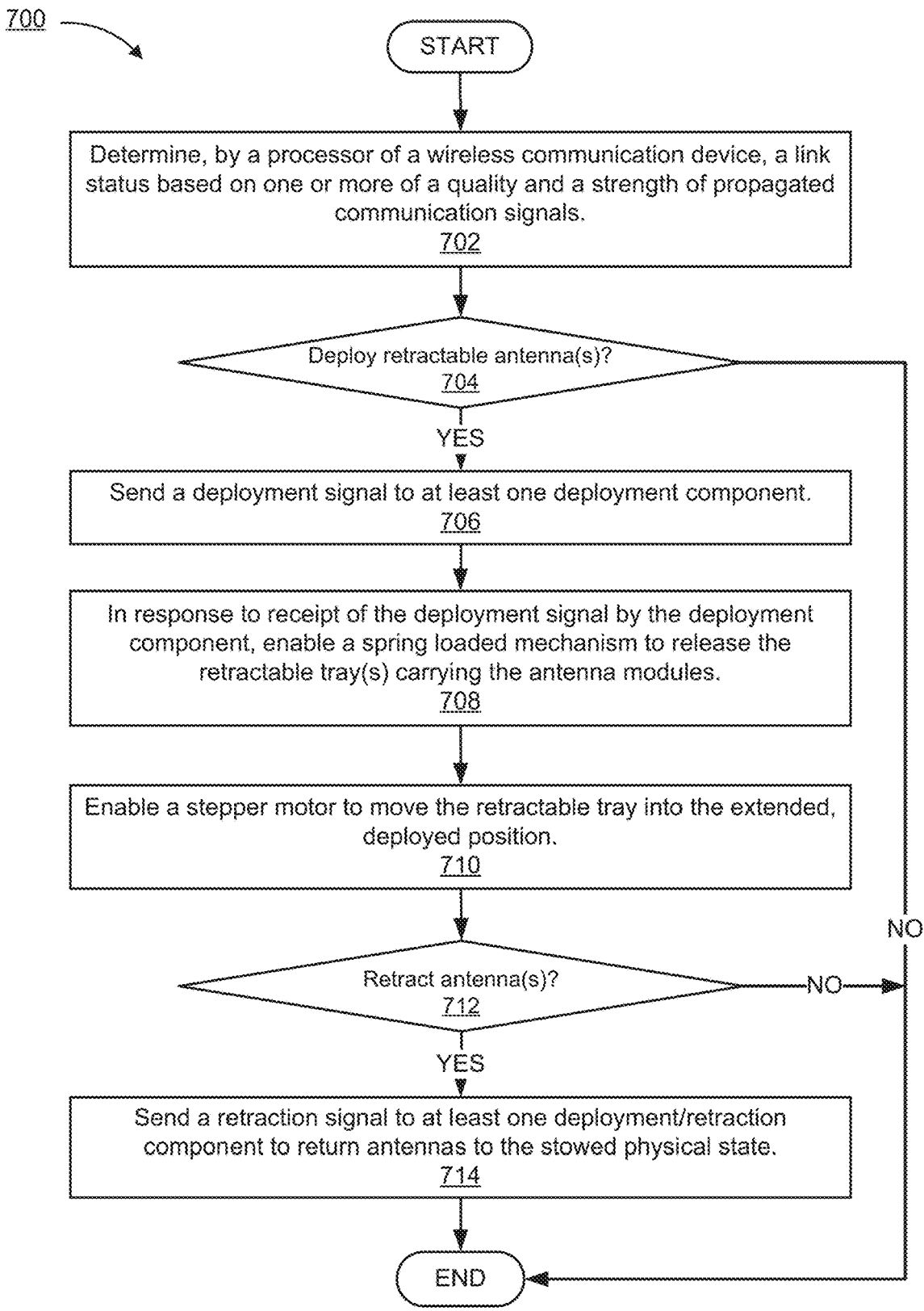
FIG. 7 is a flow chart illustrating a method for deploying and retracting a retractable antenna array based on a detected signal quality and/or strength, according to one or more embodiments.

FIGS. 5-7 present flowcharts illustrating example methods by which WCD 100 and specifically processor 106 presented within the preceding figures perform, by executing ADM 120, different aspects of the processes that enable one or more embodiments of the disclosure. Method 500 represents a method for deploying a retractable antenna array in response to a manual user input. Method 600 represents a method for deploying a retractable antenna array based on a detected signal quality and/or strength of signals propagated via WCD 100. Method 700 represents a method for deploying a retractable antenna array based on a detected signal quality and/or strength of a signal propagated using processor 106. The description of each method is provided with general reference to the specific components illustrated within the preceding figures. It is appreciated that certain aspects of the described methods may be implemented via other processing devices and/or execution of other code/firmware. In the discussion of FIGS. 5-7, reference is also made to elements described in FIGS. 1-4.

The method processes are performed by execution of ADM 120 by processor 106, and are generally described as functions performed by ADM 120, for simplification of the description. According to one or more aspects, based on a manufacturer default setting or received user setting, processor 106 configures a deployment and retraction mode of WCD 100 to one of (i) a manual, user initiated deployment and retraction mode for the at least one retractable antenna 124 and (ii) an automatic deployment and retraction mode for the at least one retractable antenna 124. Methods 500 and 600 describe device operations while WCD 100 is configured for operation in the manual deployment and retraction mode.

Method 500 begins at the start block and proceeds to block 502 at which processor 106/ADM 120 provides, via user interface 127 on display 126A of WCD 100, a notification providing a link status indicating that coverage of a target, 5G network is available (block 502). Processor 106 generates and issues a prompt, via a user interface on display 126A of WCD 100, for a user to provide a manual input in order to deploy the retractable antenna(s) (block 504). According to one or more aspects, the notification may further indicate whether the at least one retractable antenna 124 is in the stowed physical state or a deployed state. According to one or more aspects, processor 106 generates and issues the prompt for the manual user input when the at least one retractable antenna array 124 is in the stowed physical state. Processor 106 monitors for and/or detects a manual input from the user (block 506). In response to detecting the manual input, processor 106 transmits the deployment signal to deployment component 118 to deploy/extend the at least one retractable antenna 124 into the deployed position to enable communication within the target, 5G network of a signal having an acceptable quality and/or strength (block 508). The process concludes at the end block.

Method 600 begins at the start block and proceeds to block 602 at which processor 106/ADM 120 detects a first signal received via a dedicated antenna array of WCD 100. According to one or more aspects, the first signal is a 5G network signal. Processor 106 detects a second signal received via at least one fixed, non-retractable antenna (block 604). According to one or more aspects, dedicated antenna 128 is used to detect accessibility/coverage of a second/target network that is different from a first network in which the second signal is propagated via the fixed non-retractable antenna. Furthermore, dedicated antenna 128 can detect accessibility/coverage of the second/target network while the fixed non-retractable antenna enables communication within the first network. At decision block 606, processor 106 determines whether a signal strength of the first signal is less than a first threshold level. If processor 106 determines at decision block 606 that the signal strength of the first signal is not less than the first threshold level, processor 106 is able to identify (i.e., detect) that coverage of the target network, e.g., a 5G network, is available to WCD 100 (block 608) and processor generates and issues a prompt for a user of WCD 100 to elect to deploy at least one retractable antenna 124 to enable WCD 100 to access and communicate within a target network (block 610). However, if processor 106 determines that the signal strength of the first signal is less than the first threshold level, processor 106 determines whether a signal quality of the second signal is less than a second threshold level (decision block 612). If processor 106 determines at decision block 612 that the signal strength of the second signal is not less than the second threshold level, processor 106 determines that a quality of signal communication via the at least one fixed, non-retractable antenna 124 is acceptable, and the process concludes at the end block.

According to one or more aspects, before enabling antenna deployment, processor 106 determines a state of the operating environment while the link status indicates a detected coverage of a target network and/or the degraded signal quality. For example, processor 106 can use dedicated antenna array 128 to detect an in-appropriate operating environment in which a presence of a human hand can physically prevent retractable antenna 124 from being deployed into an extended, physical state. According to one or more aspects, the second signal represents signal communication within a communication network such as a 3G or 4G network. However, if processor 106 determines, at decision block 612, that the signal strength of the second signal is less than the second threshold level, processor 106 determines that the quality of signal communication via the at least one fixed, non-retractable antenna 124 is unacceptable and prompts the user to deploy the retractable antennas 124 for use in the first network (block 614). The process concludes at the end block.

With reference to FIG. 7, method 700 begins at the start block and proceeds to block 702 at which processor 106/ADM 120 determines a link status based on one or more of a quality and a strength of communication signals propagated via at least one of a first set of antennas. Based on the determined link status, processor 106 determines whether conditions are appropriate for deploying retractable antenna(s) 124 (decision block 704). According to one or more aspects, processor 106 determines that conditions are appropriate for deploying retractable antenna(s) 124 when the link status indicates that coverage of the target network is available or that the signal being propagated by the fixed, non-retractable antenna(s) 108 has degraded to a signal level that is below the threshold level. In response to determining that conditions are appropriate for deploying retractable antenna 124, processor 106 generates a deployment signal, and sends the deployment signal to the at least one deployment component 118 (block 706).

In response to receiving the signal, the at least one deployment component enables a spring loaded mechanism to release the retractable tray(s) carrying antenna modules 116 from being held or fastened to a fixed/stationary position (block 708), and processor 106 enables via the deployment signal an electromechanical component (e.g., a stepper motor) to move the retractable tray into the extended, deployed position (block 710). WCD 100 communicates via the deployed retractable antenna(s) 124 to enable propagation of a high quality signal and/or a stronger communication signal. According to one or more aspects, when the button is pressed again, retractable antenna arrays 124 will return to the docked/stowed physical state. In particular, the link status can be used to determine, at decision block 712, whether antenna tray 115 and antenna modules 116 should be retracted and returned to the stowed/docked physical state (block 714). For example, when the link status indicates that the coverage of the 5G network is no longer available, processor 106 may initiate an automatic antenna retraction process or a manual antenna retraction process that is facilitated through the use of a user prompt and buttons via the graphical user interface. The process then concludes at the end block.

In the above described flow charts of FIGS. 5-7, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A processor-implemented method comprising:
   determining, by a processor of a wireless communication device, a link status, the wireless communication device having at least one deployment component, at least one antenna module configured with at least one retractable antenna and a radio frequency (RF) transceiver coupled to the at least one antenna module, the at least one retractable antenna configured to be movable, by the at least one deployment component, from a stowed physical state to a deployed physical state, wherein the link status indicates one of two antenna deployment conditions from among a first condition comprising a detection of a coverage of a target network and a second condition comprising detection that a quality of a signal being propagated via at least one fixed, non-retractable antenna of the communication device has degraded to below a threshold level, the at least one fixed, non-retractable antenna being a different antenna from the at least one retractable antenna, wherein the detection of the coverage of the target network comprises:
   identifying, from stored information retrieved by the processor, coverage areas that are suitable for accessing the target network; and
   in response to determining that the wireless communication device is located within one of the identified coverage areas, generating said link status indicating that said coverage area, suitable for accessing the target network, is detected;
   determining, based on the determined link status, whether to initiate deployment of the at least one retractable antenna;
   in response to determining that deployment of the at least one retractable antenna is to be initiated, sending a deployment signal to the at least one deployment component, the at least one deployment component responding to receipt of the deployment signal by extending the at least one retractable antenna to the deployed physical state; and
   enabling, by the processor, the wireless communication device to communicate using the deployed at least one retractable antenna to support propagation of at least one of a higher quality and an increased strength of communication signals, wherein the wireless communication device does not utilize the at least one retractable antenna to communicate while the at least one retractable antenna is in the stowed physical state.

2. The method of claim 1, wherein the link status is based on at least one of a quality and a strength of communication signals propagated via at least one antenna of a first set of antennas, wherein the first set of antennas includes the dedicated antenna and at least one fixed, non-retractable antenna, the method further comprising:
   determining that said link status indicates a specific one of the first condition and the second condition; and
   in response to determining that said link status indicates the specific one of the first condition and the second condition, initiating deployment of the at least one retractable antenna.

3. The method of claim 1, further comprising:
   configuring a deployment and retraction mode of the at least one antenna module to one of (i) a manual, user-initiated deployment and retraction mode for the at least one retractable antenna and (ii) an automatic deployment and retraction mode for the at least one retractable antenna.

4. The method of claim 1, wherein, in response to the at least one antenna module being configured in a manual deployment and retraction mode, the method further comprises:
   providing via an interface of the wireless communication device a notification indicating said link status, the notification further indicating that the at least one retractable antenna is in the stowed physical state;
   prompting, via the interface, for a user to provide a manual input to deploy the at least one retractable antenna;
   detecting the manual input;
   transmitting the deployment signal to the at least one deployment component; and
   in response to the at least one deployment component receiving the deployment signal, the at least one deployment component extending the at least one retractable antenna into the deployed position to enable propagation of a signal having one or more of a threshold quality and strength.

5. The method of claim 1, wherein, in response to the at least one antenna module being configured in an automatic deployment and retraction mode, the method further comprises:
in response to determining said link status, determining an operating environment of the wireless communication device;
in response to the operating environment of the wireless communication device being suitable for deploying the at least one retractable antenna, automatically generating the deployment signal; and
transmitting the deployment signal to the at least one deployment component, the at least one deployment component selectively deploying the at least one retractable antenna in response to receiving the deployment signal.

6. The method of claim 1, wherein to determine that said coverage of the target network is detected, the method further comprises:
tracking a location of the wireless communication device; and
determining whether the wireless communication device is located within one of the identified coverage areas.

7. The method of claim 1, further comprising:
detecting, via a dedicated antenna module, a presence of a human hand;
identifying that said link status indicates that said signal quality has degraded to below a threshold level;
correlating the degradation of said signal quality while using at least one fixed, non-retractable antenna, with the presence of the human hand; and
in response to said signal quality being degraded to below the threshold level, triggering deployment of the at least one retractable antenna.

8. The method of claim 1, wherein said enabling further comprises:
receiving a notification from a first network that the wireless communication device is located in the target network;
determining the link status based on the received notification; and
performing one of: (i) switching a network access that is enabled for the wireless communication device from a first network to the target network, in response to the link status indicating that the target network is detected; and (ii) in response to the link status indicating that a signal quality corresponding to communication using the at least one fixed antenna has degraded below a threshold level, enhancing a quality and strength of a communication signal within the first network by utilizing the at least one retractable antenna.

9. The method of claim 1, wherein:
the RF transceiver is coupled via a flexible conductor to the at least one antenna module; and
the at least one antenna module comprises: a fifth generation (5G) mm wave antenna array having at least one antenna element, wherein the 5G mm wave antenna array comprises at least one retractable antenna; at least one radio frequency integrated circuit (RFIC) respectively coupled to the 5G mm wave antenna array; and at least one retractable tray in which the 5G mm wave antenna array is placed.

10. A wireless communication device comprising:
at least one fixed, non-retractable antenna;
at least one deployment component;
at least one antenna module having at least one retractable antenna that is configured to be movable, using the at least one deployment component, from a stowed physical state to a deployed physical state, the at least one retractable antenna being a different antenna from the at least one fixed, non-retractable antenna;
a radio frequency (RF) transceiver coupled to the at least one retractable antenna; and
a processor in communication with the RF transceiver and the at least one deployment component, and which:
determines a link status based on one or more of a quality and a strength of communication signals propagated via at least one of a first set of antennas, wherein the link status indicates one of two antenna deployment conditions, a first condition being a detection of a coverage of a target network and a second condition being a detection that a quality of a signal being propagated via at least one fixed, non-retractable antenna has degraded to below a threshold level, wherein to perform the detection of the coverage of the target network the processor:
identifies, from stored information retrieved by the processor, coverage areas that are suitable for accessing the target network; and
in response to determining that the wireless communication device is located within one of the identified coverage areas, generates said link status indicating that said coverage area, suitable for accessing the target network, is detected;
determines, based on the determined link status, whether to initiate deployment of the at least one retractable antenna;
in response to determining that deployment of the at least one retractable antenna is to be initiated, sends a deployment signal to the at least one deployment component, the deployment component extending the at least one retractable antenna to the deployed physical state in response to receiving the deployment signal; and
enables the wireless communication device to communicate using the at least one retractable antenna, which enables a propagation of at least one of a high quality and an increased strength of communication signals, wherein the wireless communication device does not utilize the at least one retractable antenna to communicate while the at least one retractable antenna is in the stowed physical state.

11. The device of claim 10, wherein the first set of antennas includes the dedicated antenna and the at least one fixed, non-retractable antenna, wherein the processor:
determines that said link status indicates at least one of the first condition and the second condition; and
in response to determining that said link status indicates detection of a specific one of the first condition and the second condition, initiates deployment of the at least one retractable antenna.

12. The device of claim 10, wherein the processor:
configures a deployment and retraction mode of the at least one antenna module to one of (i) a manual, user-initiated deployment and retraction mode for the at least one retractable antenna and (ii) an automatic deployment and retraction mode for the at least one retractable antenna.

13. The device of claim 10, further comprising an interface, wherein, in response to the at least one antenna module being configured in a manual deployment and retraction mode, the processor:
provides a notification indicating said link status on the interface of the wireless communication device, the notification further indicating that the at least one retractable antenna is in the stowed physical state;

prompts via an interface of the wireless communication device for a user to provide a manual input in order to deploy the at least one retractable antenna;

detects the manual input via the at least one deployment component; and transmits the deployment signal to the at least one deployment component, at least one deployment component extends the at least one retractable antenna into the deployed position to enable propagation of a signal having one or more of an acceptable quality and strength in response to the receiving the deployment signal.

14. The device of claim 10, wherein, in response to the at least one antenna module being configured in an automatic deployment and retraction mode, the processor:

in response to determining said link status, determines an operating environment of the wireless communication device;

in response the operating environment of the wireless communication device being suitable for deploying the at least one retractable antenna, automatically generates the deployment signal; and transmits the deployment signal to the at least one deployment component, the at least one deployment component selectively deploying the at least one retractable antenna in response to receiving the signal.

15. The device of claim 10, wherein to determine that said coverage of the target network is detected, the processor:

tracks a location of the wireless communication device;

determines whether the wireless communication device is located within one of the identified coverage areas.

16. The device of claim 10, wherein the processor:

detects, via the dedicated antenna, a presence of a human hand;

identifies that said link status indicates that said signal quality has degraded to below a threshold level;

correlates the degradation of said signal quality while using the at least one fixed, non-retractable antenna, with the presence of the human hand; and in response to said signal quality being degraded to below the threshold level, triggers deployment of the at least one retractable antenna.

17. The device of claim 10, wherein to enable the wireless communication device to communicate using the at least one retractable antenna, the processor receives a notification from a first network that the wireless communication device is located in the target network;

determines the link status based on the received notification; and performs one of: (i) switching a network access that is enabled for the wireless communication device from a first network to a target network, in response to the link status indicating that the target network is detected; and (ii) in response to the link status indicating that a signal quality corresponding to communication using the at least one fixed antenna has degraded to below a threshold level, enhancing a quality and strength of a communication signal within the first network by utilizing the at least one retractable antenna.

18. The device of claim 10, wherein:

the RF transceiver is coupled via a flexible conductor to the at least one antenna module; and the at least one antenna modules comprises: a fifth generation (5G) mm wave antenna array having at least one antenna element, wherein the 5G mm wave antenna array is the at least one retractable antenna; at least one radio frequency integrated circuit (RFIC) respectively coupled to the 5G mm wave antenna array; and at least one retractable tray in which the 5G mm wave antenna array is placed.

19. A computer program product comprising at least one non-transitory computer-readable storage medium having stored thereon computer-executable program code, which when executed by a processor of a wireless communication device, causes the wireless communication device to:

determine a link status based on one or more of a quality and a strength of communication signals propagated via at least one antenna of a first set of antennas, wherein the link status indicates one of two antenna deployment conditions, a first condition being a detection of a coverage of a target network and a second condition being a detection that a quality of a signal being propagated via at least one fixed, non-retractable antenna has degraded to below a threshold level, the at least one fixed, non-retractable antenna being a different antenna from the at least one retractable antenna, wherein to perform the detection of the coverage of the target network, the computer-executable program code causes the wireless communication device to:

identify, from stored information retrieved by the processor, coverage areas that are suitable for accessing the target network; and in response to determining that the wireless communication device is located within one of the identified coverage areas, generate said link status indicating that said coverage area, suitable for accessing the target network, is detected;

determine, based on the determined link status, whether to initiate deployment of the at least one retractable antenna;

in response to determining that deployment of the at least one retractable antenna is to be initiated, send a deployment signal to the at least one deployment component, the at least one deployment component extending the at least one retractable antenna to the deployed physical state in response to receiving the deployment signal; and enable the wireless communication device to communicate using the at least one retractable antenna, which enables a propagation of at least one of a high quality and an increased strength of communication signals, wherein the wireless communication device does not utilize the at least one retractable antenna to communicate while the at least one retractable antenna is in the stowed physical state.

20. The computer program product of claim 19, wherein the computer-executable program code further causes the communication device to:

determine that said link status indicates one of the first condition and the second condition;

in response to determining that said link status indicates detection of a specific one of the first condition and the second condition-initiating deployment of the at least one retractable antenna; and in response to the at least one antenna module being configured in a manual deployment and retraction mode:

provide, via an interface of the wireless communication device a notification indicating said link status, the notification further indicating that the at least one retractable antenna is in the stowed physical state;

prompt, via the interface, for a user to provide a manual input to deploy the at least one retractable antenna;
detect the manual input;
transmit the deployment signal to the at least one deployment component; and
in response to the at least one deployment component receiving the deployment signal, extend, via the at least one deployment component the at least one retractable antenna into the deployed position to enable propagation of a signal having one or more of a threshold quality and strength.

* * * * *